US012748874B2

(12) United States Patent
Roscoe et al.

(10) Patent No.: US 12,748,874 B2
(45) Date of Patent: Sep. 29, 2026

(54) GRAPH-BASED CONDITION IDENTIFICATION

(71) Applicant: BRITISH TELECOMMUNICATIONS PUBLIC LIMITED COMPANY, London (GB)

(72) Inventors: Jonathan Roscoe, London (GB); Robert Hercock, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/693,623

(22) PCT Filed: Aug. 24, 2022

(86) PCT No.: PCT/EP2022/073618
§ 371 (c)(1),
(2) Date: Mar. 20, 2024

(87) PCT Pub. No.: WO2023/046402
PCT Pub. Date: Mar. 30, 2023

(65) Prior Publication Data

US 2024/0394393 A1 Nov. 28, 2024

(30) Foreign Application Priority Data

Sep. 21, 2021 (GB) ..................................... 2113473

(51) Int. Cl.
*G06F 21/62* (2013.01)
*G06F 16/901* (2019.01)

(52) U.S. Cl.
CPC ...... *G06F 21/6218* (2013.01); *G06F 16/9024* (2019.01)

(58) Field of Classification Search
CPC .. G06F 21/6218; G06F 16/9024; G06F 21/82; G06F 21/6227; G06F 21/604; G06F 16/90335; G06N 5/022
See application file for complete search history.

(56) References Cited

U.S. PATENT DOCUMENTS 5,812,998 A 9/1998 Tsutsumi et al.
7,403,951 B2 7/2008 Setlur et al.
(Continued)

FOREIGN PATENT DOCUMENTS

CN 102706352 B 11/2014
CN 104933175 A 9/2015
(Continued)

OTHER PUBLICATIONS

International Search Report and Written Opinion received for PCT Patent Application No. PCT/EP2022/073618, mailed on Dec. 6, 2022, 14 pages.
(Continued)

*Primary Examiner* — Hosuk Song
(74) *Attorney, Agent, or Firm* — EIP US LLP

(57) ABSTRACT

A computer implemented method for detecting the existence of a condition indicated by data represented by a set of input graph data structures can include receiving at least a pair of training graph data structures of nodes and edges wherein each node indicates one or more characteristics of an event and each edge indicates an association between events, and wherein at least a subset of nodes and edges in each training graph relate to the existence of the condition, identifying an association between at least one pair of nodes in which each node of a pair occurs in a disparate training graph and at least one of the pair of nodes relates to the existence of the condition, and generating an edge between the pair of nodes so as to generate a composite training graph including at least a pair of the training graph data structures; extracting
(Continued)

a proper subgraph of the composite training graph including at least one of the at least one pair of nodes, such that the proper subgraph indicates the existence of the condition including nodes and edges from each of the pair of graphs for comparison with the set of input graphs to identify an indication of the existence of the condition by the input graphs.

9 Claims, 2 Drawing Sheets

(56) References Cited

U.S. PATENT DOCUMENTS

| | | | |
|---|---|---|---|
| 7,660,441 B2 | 2/2010 | Chen et al. | |
| 7,933,451 B2 | 4/2011 | Kloer | |
| 8,441,958 B2 | 5/2013 | Thubert et al. | |
| 8,576,229 B2 | 11/2013 | Dykes et al. | |
| 9,119,055 B2 | 8/2015 | Vaccari et al. | |
| 9,305,264 B2 | 4/2016 | Miró | |
| 9,911,340 B2 | 3/2018 | Samarasekera et al. | |
| 10,496,722 B2 | 12/2019 | Bobick et al. | |
| 10,917,425 B2 * | 2/2021 | Liu | G06N 20/00 |
| 11,481,687 B2 * | 10/2022 | Fang | G06F 21/31 |
| 11,941,374 B2 * | 3/2024 | Makhija | G06N 3/08 |
| 11,989,964 B2 * | 5/2024 | Agarwal | G06V 30/416 |
| 12,015,628 B1 * | 6/2024 | Lv | H04L 63/1416 |
| 12,267,337 B2 * | 4/2025 | Hercock | H04L 63/1416 |
| 2007/0182818 A1 | 8/2007 | Buehler | |
| 2010/0191532 A1 | 7/2010 | Rodriguez et al. | |
| 2015/0070506 A1 | 3/2015 | Chattopadhyay et al. | |
| 2017/0063910 A1 | 3/2017 | Muddu et al. | |
| 2018/0299877 A1 | 10/2018 | Cheng et al. | |
| 2018/0329958 A1 | 11/2018 | Choudhury et al. | |
| 2019/0065869 A1 | 2/2019 | Savla et al. | |
| 2020/0081445 A1 | 3/2020 | Stetson et al. | |
| 2020/0097491 A1 | 3/2020 | Berthiaume | |
| 2020/0151272 A1 | 5/2020 | Freitag et al. | |
| 2020/0160101 A1 | 5/2020 | Kim et al. | |
| 2021/0042499 A1 | 2/2021 | Hammad et al. | |
| 2021/0152574 A1 | 5/2021 | Maida et al. | |
| 2021/0279280 A1 | 9/2021 | M G et al. | |
| 2022/0335806 A1 | 10/2022 | Dice et al. | |
| 2023/0072641 A1 | 3/2023 | Parameswaran et al. | |
| 2024/0394332 A1 | 11/2024 | Roscoe et al. | |
| 2024/0395018 A1 | 11/2024 | Roscoe et al. | |

FOREIGN PATENT DOCUMENTS

| | | |
|---|---|---|
| CN | 107527038 A | 12/2017 |
| CN | 106777373 B | 4/2018 |
| CN | 108694244 A | 10/2018 |
| CN | 109140168 A | 1/2019 |
| EP | 2123221 A2 | 11/2009 |
| EP | 3681124 A1 | 7/2020 |
| JP | H096958 A | 1/1997 |
| JP | H11345342 A | 12/1999 |

OTHER PUBLICATIONS

International Search Report and Written Opinion received for PCT Patent Application No. PCT/EP2022/073619, mailed on Nov. 9, 2022, 11 pages.

International Search Report and Written Opinion received for PCT Patent Application No. PCT/EP2022/073620, mailed on Nov. 30, 2022, 11 pages.

Office Action received for Great Britain Patent Application No. 2113472.1, mailed on Mar. 7, 2022, 8 pages.

Office Action received for Great Britain Patent Application No. 2113473.9, mailed on Feb. 16, 2022, 7 pages.

Office Action received for Great Britain Patent Application No. 2113474.7, mailed on Jan. 31, 2022, 7 pages.

"The IBM i2 Intelligence Analysis Portfolio Delivers Powerful New Capabilities to Significantly Enhance the User Experience and to Extend Applicability to a Wider Community", IBM United States Software Announcement 218-262, Jun. 19, 2018, pp. 1-13.

Ahmed , et al., "On the Effect of Geometries Simplification on Geo-spatial Link Discovery", Procedia Computer Science, vol. 137, 2018, pp. 139-150.

Bazgir , et al., "Representation of Features as Images with Neighborhood Dependencies for Compatibility with Convolutional Neural Networks", Nature Communications, vol. 11, No. 4391, 2020, pp. 1-13.

Csillik , et al., "Object-Based Time-Constrained Dynamic Time Warping Classification of Crops Using Sentinel-2", Remote Sensing, vol. 11, No. 1257, 2019, pp. 1-26.

Djuric , et al., "Motion Prediction of Traffic Actors for Autonomous Driving using Deep Convolutional Networks", Available at <arXiv:1808.05819v1>, Aug. 17, 2018, 10 pages.

Esri Arcgis Blog , "How to Perform Spatial Analysis", Available Online at <https://www.esri.com/arcgis-blog/products/analytics/analytics/how-to-perform-spatial-analysis/>, Feb. 28, 2018, 6 pages.

Janeja , et al., "Detecting Anomalous Geospatial Trajectories through Spatial Characterization and Spatio-Semantic Associations", Proceedings of the 2004 Annual National Conference on Digital Government Research, Article No. 22, May 2004, pp. 1-10.

Jean , et al., "Tile2Vec: Unsupervised Representation Learning for Spatially Distributed Data", Available Online at <https://arxiv.org/abs/1805.02855v2>, May 30, 2018, pp. 1-19.

Jiang , et al., "Geospatial Data to Images: A Deep-Learning Framework for Traffic Forecasting", Tsinghua Science and Technology, vol. 24, No. 1, Feb. 2019, pp. 52-64.

Mccoy , et al., "ArcGIS 9: Using ArcGIS Spatial Analyst", Environmental Systems Research Institute, 2001, pp. 1-238.

Rath , et al., "Word Image Matching Using Dynamic Time Warping", IEEE Computer Society Conference on Computer Vision and Pattern Recognition, 2003, pp. 1-7.

Sharif , et al., "Context-Awareness in Similarity Measures and Pattern Discoveries of Trajectories: A Context-based Dynamic Time Warping Method", GIScience & Remote Sensing, vol. 54, No. 3, 2017, pp. 426-452.

Sharma , et al., "DeepInsight: A Methodology to Transform a Non-Image Data to an Image for Convolution Neural Network Architecture", Scientific Reports, vol. 9, No. 11399, 2019, pp. 1-7.

Wang , et al., "Classifying NBA Offensive Plays Using Neural Networks", Research Papers Competition, MIT Sloan Sports Analytics Conference, 2016, pp. 1-9.

Candia et al., Uncovering individual and collective human dynamics from mobile phone records, J. Phys. A: Math. Theor. 41 (2008) 224015 (11pp), Published May 21, 2008.

Chuanga et al., Local alliances and rivalries shape near-repeat terror activity of al-Qaeda, ISIS, and insurgents, PNAS, Oct. 15, 2019, vol. 116, No. 42, 20898-20903.

Cohen, node2vec: Embeddings for Graph Data, Apr. 16, 2018 (https://towardsdatascience.com/node2vec-embeddings-for-graph-data-32a866340fef).

Faucher, Python: Detecting Twitter Bots with Graphs and Machine Learning, Aug. 7, 2020 (https://towardsdatascience.com/python-detecting-twitter-bots-with-graphs-and-machine-learning-41269205ab07).

Godec, Graph Embeddings—The Summary, Dec. 31, 2018 (https://towardsdatascience.com/graph-embeddings-the-summary-cc6075aba007).

Goyal et al., Graph Embedding Techniques, Applications, and Performance: A Survey, arXiv: 1705.02801, May 9, 2017.

Grover et al., node2vec: Scalable Feature Learning for Networks, Proceedings of the 22nd ACM SIGKDD international conference on Knowledge discovery and data mining, Aug. 13-17, 2016, San Francisco, CA, USA.

Liu et al., Crisisbert: A Robust Transformer for Crisis Classification and Contextual Crisis Embedding, arXiv:2005.06627, May 18, 2020.

Narayanan et al., graph2vec: Learning Distributed Representations of Graphs, arXiv:1707.05005, Jul. 17, 2017.

(56) References Cited

OTHER PUBLICATIONS

Perozzi et al., DeepWalk: Online Learning of Social Representations, arXiv: 1403.6652, Jun. 27, 2014.
Wang et al., Structural Deep Network Embedding, Proceedings of the 22nd ACM SIGKDD international conference on Knowledge discovery and data mining, Aug. 13-17, 2016, San Francisco, CA, USA.
Palash (palash1992), "GEM," GitHub repository, https://github.com/palash1992/GEM, last accessed Apr. 14, 2026.
Elior Cohen (eliorc), "Nod2Vec-FIFA17-Example.ipynb," GitHub repository, https://github.com/eliorc/Medium/blob/master/Nod2Vec-FIFA17-Example.ipynb (accessed Apr. 14, 2026).
Medusa Labs, "Medusa®—Social Media Intelligence and OSINT Platform," https://www.medusa-labs.com/ (accessed Apr. 14, 2026).
Siren, "Law Enforcement and Intelligence—Search-based Investigative Intelligence Platform for data analysis and link analysis," https://siren.io/law-enforcement-and-intelligence/ (accessed Apr. 14, 2026).

* cited by examiner

GRAPH-BASED CONDITION IDENTIFICATION

PRIORITY CLAIM

The present application is a National Phase entry of PCT Application No. PCT/EP2022/073618, filed Aug. 24, 2022, which claims priority from GB Application No. 2113473.9 filed Sep. 21, 2021, each of which hereby fully incorporated herein by reference.

TECHNICAL FIELD

The present disclosure relates to the identification of the existence of a condition identified by data represented by graph data structures.

BACKGROUND

Physical occurrences such as physical security occurrences are beneficially detected and identified in good time for reactive, remediative and/or responsive measures. For example, criminal acts against equipment used by the telecommunications industry can result in considerable costs for communications providers and degradation or interruption of service for their customers.

SUMMARY

It is therefore beneficial to detect occurrences of such events in an effective and timely manner.

According to a first aspect of the present disclosure, there is provided a computer implemented method for detecting the existence of a condition indicated by data represented by a set of input graph data structures, the method comprising: receiving at least a pair of training graph data structures of nodes and edges wherein each node indicates one or more characteristics of an event and each edge indicates an association between events, and wherein at least a subset of nodes and edges in each training graph relate to the existence of the condition, the method comprising: identifying an association between at least one pair of nodes in which each node of a pair occurs in a disparate training graph and at least one of the pair of nodes relates to the existence of the condition, and generating an edge between the pair of nodes so as to generate a composite training graph including at least a pair of the training graph data structures; extracting a proper subgraph of the composite training graph including at least one of the at least one pair of nodes, such that the proper subgraph indicates the existence of the condition including nodes and edges from each of the pair of graphs for comparison with the set of input graphs to identify an indication of the existence of the condition by the input graphs.

In some embodiments, the set of input graph data structures includes at least two input graphs of nodes and edges, and the method further comprises: identifying an association between at least one pair of nodes in the input graphs in which each node of a pair occurs in a disparate input graph, and generating an edge between the pair of nodes so as to generate a composite input graph including at least a pair of input graph data structures; searching the composite input graph for occurrences of the proper subgraph to identify an indication of the existence of the condition by the input graphs so as to determine the existence of the condition.

In some embodiments, identifying an association between a pair of nodes includes one or more of: identifying a semantic association between the pair of nodes; identifying a vector similarity between the pair of nodes based on a vector embedding; identifying a geospatial similarity between the pair of nodes; identifying an association based on centrality, node-degree, eigenvector or betweenness of the pair of nodes; identifying a temporal similarity between the pair of nodes; and applying a clustering process in which the pair of nodes are clustered together.

In some embodiments, the proper subgraph is defined based on one or more predetermined criteria for identifying limits of one or more of a size, scope or extent of the proper subgraph.

In some embodiments, searching the composite input graph for occurrences of the proper subgraph includes searching for arrangements of nodes and edges between nodes in the proper subgraph occurring in the composite input graph irrespective of data stored or represented by or with the nodes of the proper subgraph and the composite input graph.

In some embodiments, data stored by one or more nodes and/or edges of the proper subgraph and the composite input graph is protected from disclosure.

In some embodiments, the protected data is protected by one or more of: encryption; data obfuscation; data redaction; data removal; and data replacement.

In some embodiments, the condition is a security condition.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE DRAWINGS

Embodiments of the present disclosure will now be described, by way of example only, with reference to the accompanying drawings, in which.

DETAILED DESCRIPTION

Figure 1:
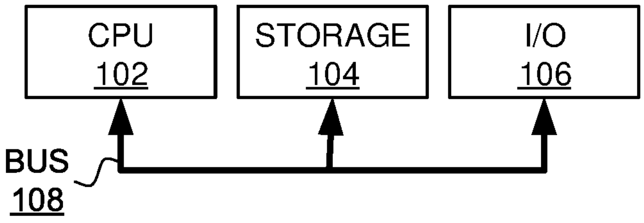
FIG. 1 is a block diagram a computer system suitable for the operation of implementations of the present disclosure.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Physical occurrences such as physical security occurrences involving happenings taking place at one or a number of geospatial locations can be indicative of a condition such as the occurrence of a security event. For example, in the telecommunications industry, an event such as criminal damage to telecommunications equipment such as a cellular tower, cabinet, pole or the like, can occur at a geospatial location and can involve occurrences related to, and/or indicative of, the event occurring in one or more geospatial locations. Similarly, criminal activity can be associated with occurrences taking place at one or more geospatial locations, such occurrences being potentially disparate. For example, the presence of an entity or individual at a first location, the undertaking of one or more particular behaviors at a second location, the detection of a vehicle at a third location by automated number plate recognition, and the occurrence of a crime at a fourth location can all be related and indicative of criminal behavior leading to the crime.

Whereas related events may be readily associated and used to infer the existence of a particular condition, seemingly unrelated events or sets of events may not be so readily associated. Implementations of the present disclosure are operable with graph data structures including nodes and edges in which nodes are indicative of characteristics of an event and edges are indicative of associations between events. In particular, multiple such graph data structures of events are processed in implementations of the present disclosure to identify associations therebetween for generating a subgraph as a motif of the existence of the condition suitable for use in searching input graphs. Identifications of such a subgraph motif in input graphs serve to indicate the existence of the condition by the input graphs.

Thus, embodiments of the disclosure involve initially processing training graph data structures that are known to include data related to the existence of the condition. At least two such training graphs are processed to identify associations between the training graphs by way of associations between pairs of events where each node in a pair occurs in a disparate training graph. Such associations between a pair of nodes can be identified based on known graph comparison and node comparison techniques such as, inter alia: identifying a semantic association between the pair of nodes; identifying a vector similarity between the pair of nodes based on a vector embedding; identifying a geospatial similarity between the pair of nodes; identifying an association based on centrality, node-degree, eigenvector or betweenness of the pair of nodes; identifying a temporal similarity between the pair of nodes; and applying a clustering process in which the pair of nodes are clustered together.

Once associations are determined, a new edge is generated between associated nodes in the training graphs to generate a composite training graph from which a proper subgraph is extracted including the associated nodes. It will be appreciated by those skilled in the art that the term "proper" subgraph is intended to refer to a subgraph of the composite training graph in which at least one node or edge in the composite graph is not present in the subgraph. The proper subgraph thus constitutes a basis on which other composite graphs may be searched to identify an indication of the existence of the condition. In some implementations, the definition of the proper subgraph can be defined based on one or more predetermined criteria for identifying limits of one or more of a size, scope or extent of the proper subgraph.

Thus, in use, the proper subgraph is used to search a composite graph generated from a plurality of input graphs with associations identified therebetween to inform a determination of an identification of the existence of the condition.

Figure 2:
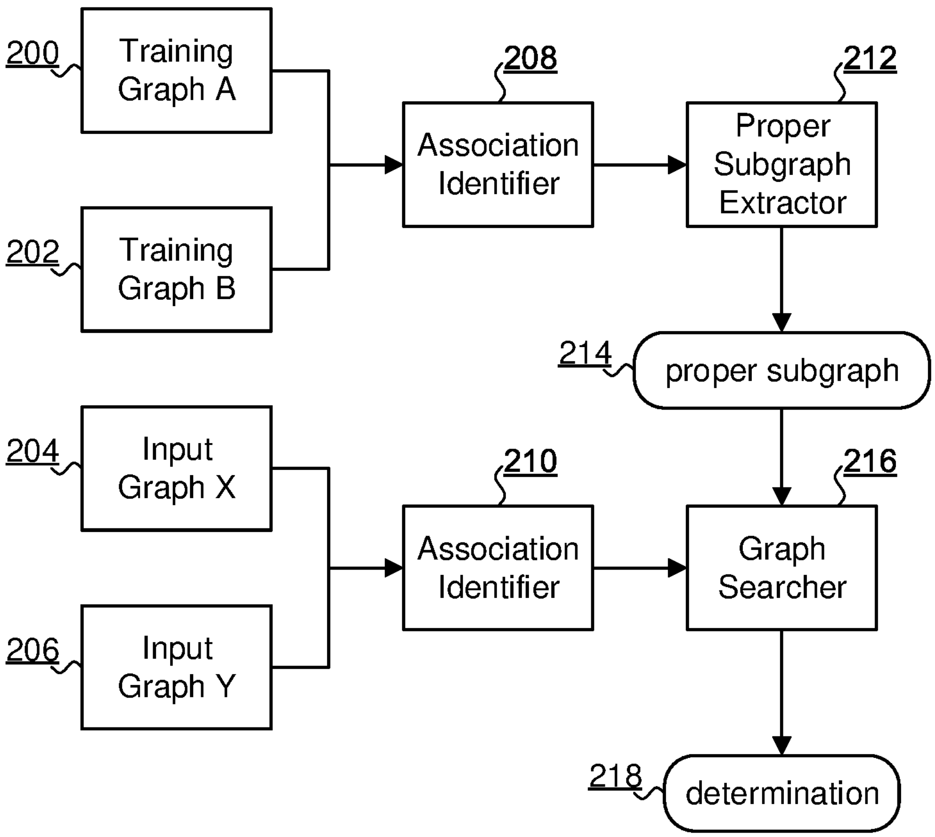
FIG. 2 is a component diagram of an arrangement for detecting the existence of a condition indicated by data represented by a set of input graph data structures according to an exemplary implementation of the present disclosure.

FIG. 2 is a component diagram of an arrangement for detecting the existence of a condition indicated by data represented by a set of input graph data structures 204, 206 according to an exemplary implementation of the present disclosure. Training graphs 200 and 202 are graph data structures of nodes and edges in which each node is indicative of one or more characteristics of an event and each edge indicates an association between events. At least a subset of nodes and edges in each training graph relates to the existence of a condition, such as a security condition or the like.

An association identifier 208 is provided as a hardware, software, firmware or combination component arranged to identify an association between at least one pair of nodes in which each node of a pair occurs in a different one of the training graphs 200, 202. In particular, the association is identified to occur between a pair of nodes in which at least one node of the pair relates to the existence of the condition. Such an association identified by the association identifier 208 is represented by the generation of a new edge between the pair of associated nodes so as to generate a composite of the two training graphs 200, 202-*a* composite training graph. The new edge thus constitutes a link between the training graphs 200, 202 via at least one node related to the existence of the condition.

A proper subgraph extractor 212 is provided as a hardware, software, firmware or combination component arranged to extract a proper subgraph 214 of the composite training graph including at least one of the pairs of associated nodes identified by the association identifier 208. The proper subgraph 214 thus constitutes a criterion for searching composite graphs to identify indications of the condition.

In use, at least two input graphs 204, 206 are received by an association identifier 210. The association identifier 210 can be substantially similar to that of association identifier 208 described above except that the association identifier 210 identifies associations between the input graphs 204, 206 without knowledge of whether nodes in the input graphs 205, 206 are related to the condition. Thus, the association identifier 210 generates a composite input graph of at least a pair of input graphs.

A graph searcher 216 is provided as a hardware, software, firmware or combination component arranged to search the composite input graph for occurrences of the proper subgraph 214. In some implementations of the present disclosure, the graph searcher 216 searches the composite input graph for occurrences of the proper subgraph 214 by searching for arrangements of nodes and edges between nodes in the proper subgraph 214 that occur in the composite input graph. In particular, in some implementations, the graph searcher 216 does not search for particular data stored or represented by or in association with nodes and/or edges in the proper subgraph 214, such that the proper subgraph 214 constitutes a graph motif (the structure of a graph) on which basis the composite input graph is searched. Accordingly, literal identity between data represented by the proper subgraph 214 and subgraphs of the composite input graph are not required.

In some implementations the proper subgraph 214 is converted into a convenient format such as a JSON object format for storage in a suitable database.

Thus, the graph searcher 216 is operable to process the composite input graph with the proper subgraph 214 to identify indications of the existence of the condition in the composite input graph.

In some implementations, the data stored in either or both the training graphs 202, 202 and/or the input graphs 204, 206 can include sensitive data such as personal identification information, financial information, confidential information, or information implicated by the European General Data Protection Regulation (GDPR) or similar such regulations or provisions elsewhere. Accordingly, in some arrangements the proper subgraph 214 and/or the composite input graph may include data that is not, should not or cannot be readily reproduced, stored, shared or used without breaching privacy or regulatory requirement, for example. As previously described, some implementations of the disclosure are operable on the basis of comparisons by the graph searcher 216 of arrangements of nodes and edges between nodes in the proper subgraph 214 occurring in the composite input graph, irrespective of the data stored in or by the subgraph 214 or composite input graph. Accordingly, in some implementations, data stored in the proper subgraph 214 and/or composite input graph can be sanitized, encrypted, redacted or otherwise protected such that the data is not accessible, shared or available, while retaining the ability of an implementation of the present disclosure to identify the structure of the proper subgraph 214 occurring in the composite input graph.

Figure 3:
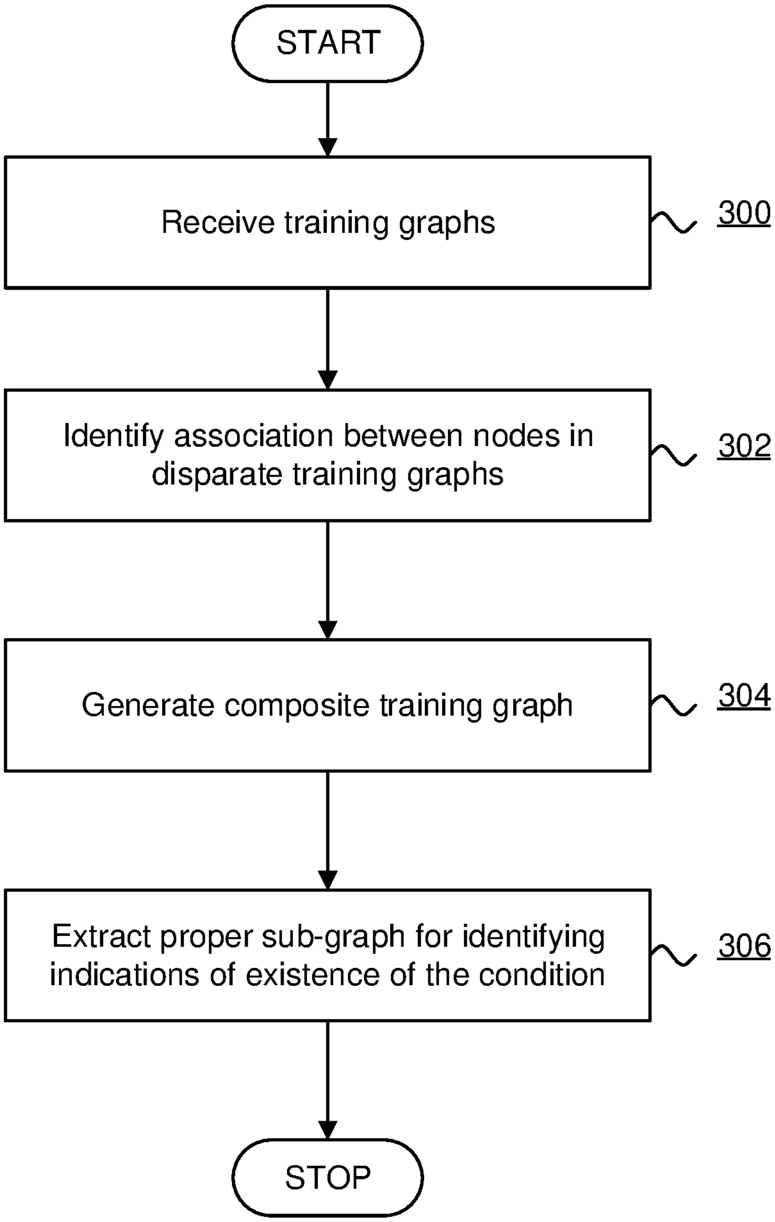
FIG. 3 is a flowchart of a method for detecting the existence of a condition indicated by data represented by a set of input graph data structures according to an exemplary implementation of the present disclosure.

FIG. 3 is a flowchart of a method for detecting the existence of a condition indicated by data represented by a set of input graph data structures 204, 206 according to an exemplary implementation of the present disclosure. Initially, at 300, the method receives the training graphs 200, 202. Subsequently, at 302, the method identifies an association between nodes in disparate training graphs 200, 202 to generate a new edge therebetween so constituting a composite training graph at 304. At 306 proper subgraph 214 is extracted for identifying indications of the existence of the condition in input graphs.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for detecting an existence of a condition indicated by data represented by a set of at least two input graph data structures of nodes and edges, the method comprising:

receiving at least a pair of training graph data structures of nodes and edges, wherein each node indicates one or more characteristics of an event and each edge indicates an association between events, and wherein at least a subset of the nodes and the edges in each training graph data structure relate to the existence of the condition;

identifying an association between at least one pair of nodes in which each node of a pair occurs in a disparate training graph data structure and at least one of the pair of nodes relates to the existence of the condition, and generating an edge between the pair of nodes so as to generate a composite training graph data structure including at least a pair of the training graph data structures;

extracting a proper subgraph of the composite training graph data structure including at least one of the at least one pair of nodes, such that the proper subgraph indicates the existence of the condition including the nodes and the edges from each of the pair of graphs for comparison with the set of at least two input graph data structures to identify an indication of the existence of the condition by the input graph data structures;

identifying an association between at least one pair of nodes in the input graph data structures in which each node of a pair occurs in a disparate input graph data structure, and generating an edge between the pair of nodes so as to generate a composite input graph data structure including at least a pair of the input graph data structures; and searching the composite input graph data structure for occurrences of the proper subgraph to identify an indication of the existence of the condition by the input graph data structures so as to determine the existence of the condition.

2. The method of claim 1, wherein identifying an association between a pair of nodes includes one or more of: identifying a semantic association between the pair of nodes; identifying a vector similarity between the pair of nodes based on a vector embedding; identifying a geospatial similarity between the pair of nodes; identifying an association based on centrality, node-degree, eigenvector or betweenness of the pair of nodes; identifying a temporal similarity between the pair of nodes; or applying a clustering process in which the pair of nodes are clustered together.

3. The method of claim 1, wherein the proper subgraph is defined based on one or more predetermined criteria for identifying limits of one or more of a size, a scope, or an extent of the proper subgraph.

4. The method of claim 1, wherein searching the composite input graph data structure for occurrences of the proper subgraph includes searching for arrangements of the nodes and the edges between the nodes in the proper subgraph occurring in the composite input graph data structure irrespective of data stored or represented by or with the nodes of the proper subgraph and the composite input graph.

5. The method of claim 4, wherein data stored by at least one or more nodes or one or more edges of the proper subgraph and the composite input graph data structure is protected from disclosure.

6. The method of claim 5, wherein the protected data is protected by one or more of: encryption; data obfuscation; data redaction; data removal; or data replacement.

7. The method of claim 1, wherein the condition is a security condition.

8. A computer system comprising a processor and memory storing computer program code for performing the method of claim 1.

9. A non-transitory computer-readable storage medium comprising computer program code to, when loaded into a computer system and executed thereon, cause the computer system to perform the method as claimed in claim 1.

* * * * *